United States Patent [19]

Gill et al.

[11] 4,270,454

[45] Jun. 2, 1981

[54] INKER RING WHEEL

[75] Inventors: Bernard J. Gill, Dundee; Burton L. Siegal, Skokie; Randy P. Goettsche, Highland Park, all of Ill.

[73] Assignee: Kiwi Coders Corporation, Wheeling, Ill.

[21] Appl. No.: 91,457

[22] Filed: Nov. 5, 1979

[51] Int. Cl.³ ............... B41F 31/26; B41L 27/28
[52] U.S. Cl. ........................... 101/348; 101/35
[58] Field of Search ............... 101/35, 329, 330, 331, 101/348, 349, 375, 376, 377, 381, 350, 351, 352; 29/124, 130; 118/DIG. 15; 85/84 (U.S. only)

[56] References Cited

U.S. PATENT DOCUMENTS

| | | | |
|---|---|---|---|
| 648,890 | 5/1900 | Williams | 29/124 |
| 784,375 | 3/1905 | Antoine | 101/377 X |
| 1,018,060 | 2/1912 | Jahn | 101/377 X |
| 1,439,755 | 12/1922 | Post | 101/349 X |
| 1,693,864 | 12/1928 | Pierce | 101/350 X |
| 1,949,688 | 3/1934 | Kranz | 101/375 |
| 2,332,476 | 10/1943 | Thaxton | 29/130 X |
| 2,923,232 | 2/1960 | Worth | 101/35 |
| 4,044,677 | 8/1977 | Hamisch, Jr. | 101/348 |
| 4,114,509 | 9/1978 | Poe | 85/84 |
| 4,126,090 | 11/1978 | McKay | 101/329 X |

*Primary Examiner*—Edgar S. Burr
*Assistant Examiner*—C. A. Pearson
*Attorney, Agent, or Firm*—Silverman, Cass & Singer, Ltd.

[57] ABSTRACT

An inker wheel comprising a pair of axially mateable plastic molded discs defining a centrally apertured hub and a concentric annular channel mounting a flexible annular inking ring. One disc carries plural concentric rim pairs arranged to define the mounting channel when the discs are assembled. One rim of each pair is narrow to fix the channel width at one dimension to accommodate one width ring, the narrow rim being selectively removed if a second wider ring is to be accommodated. The pair of discs being selectively machinable to remove an outer portion thereof so that an inner pair of rims define the mounting channel for an inking ring of lesser, yet predetermined diameter can be accommodated. Grommet-plunger fasteners are provided to effect a releasable coupling. Thus a pair of molded members are provided for making at least four differently dimensioned inking wheels.

11 Claims, 12 Drawing Figures

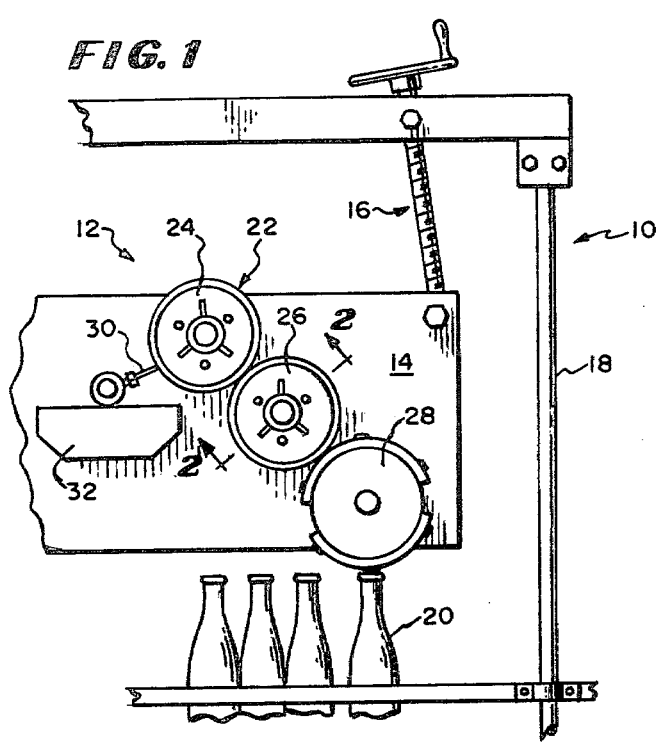
FIG. 1
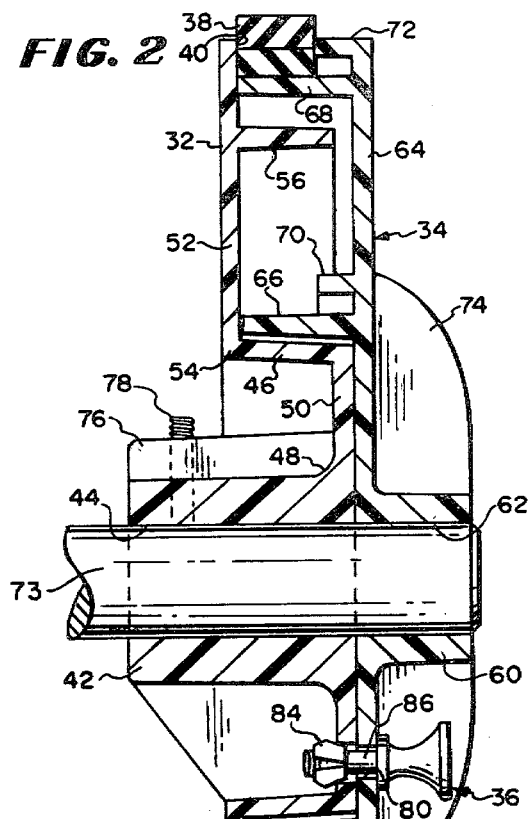
FIG. 2
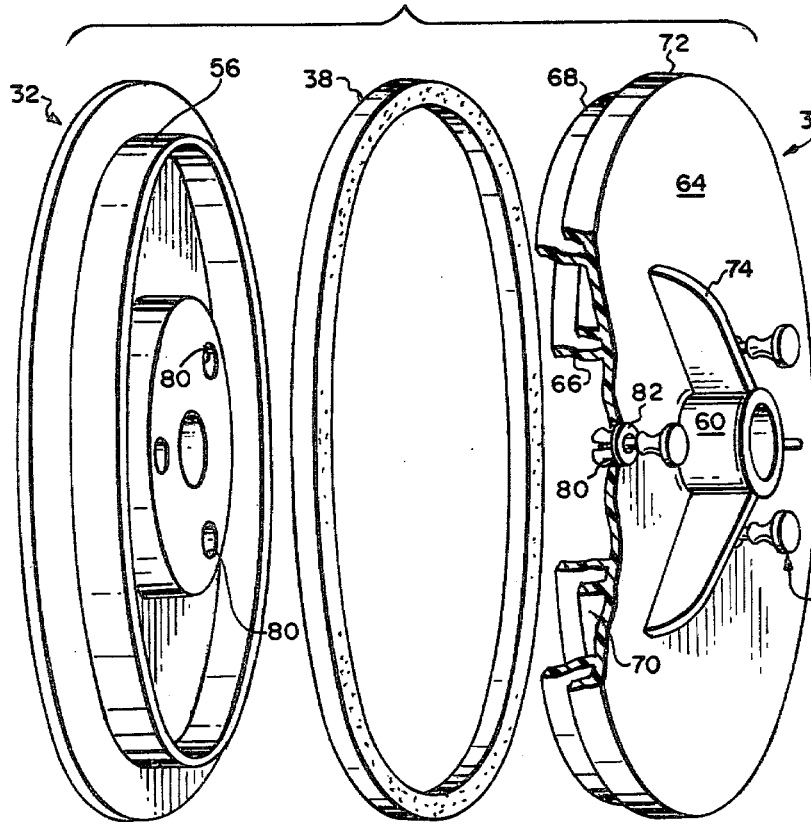
FIG. 3
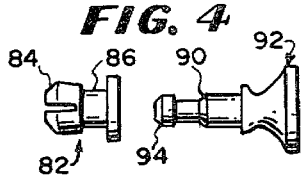
FIG. 4
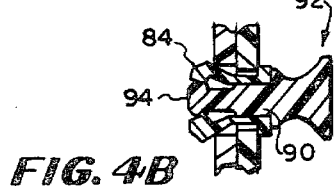
FIG. 4A
FIG. 4B

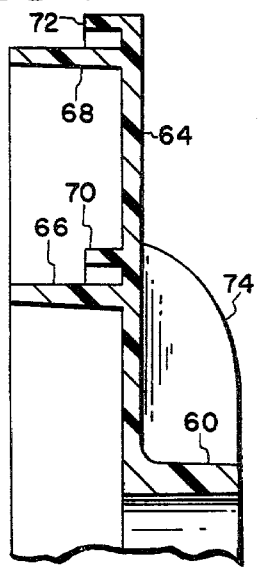
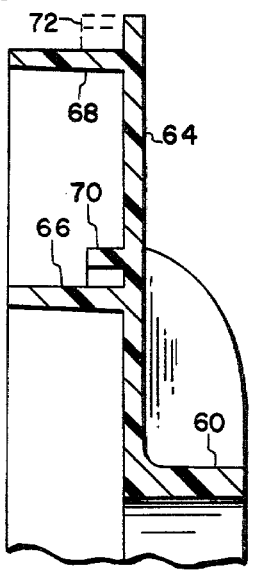
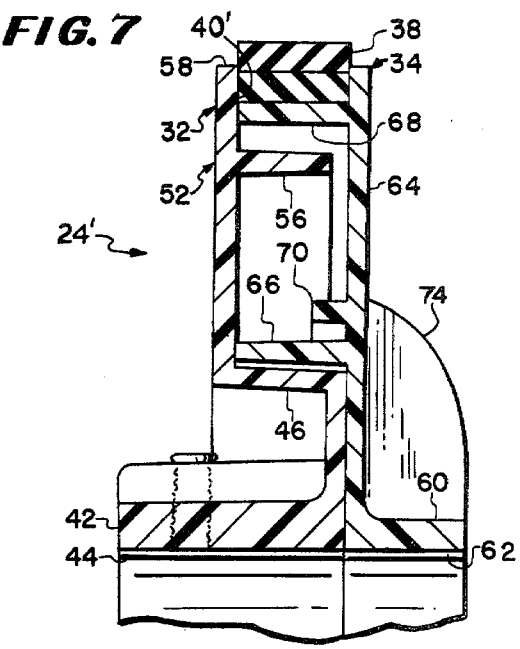
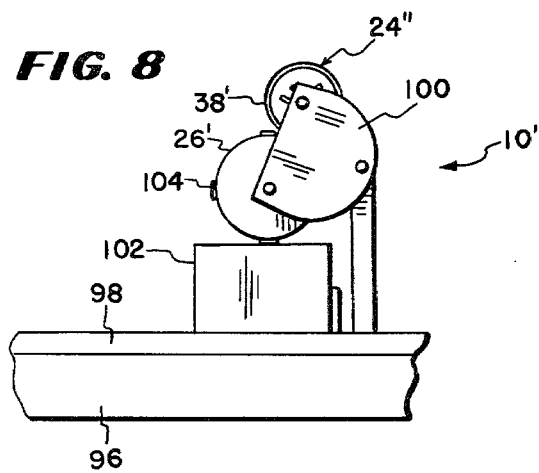
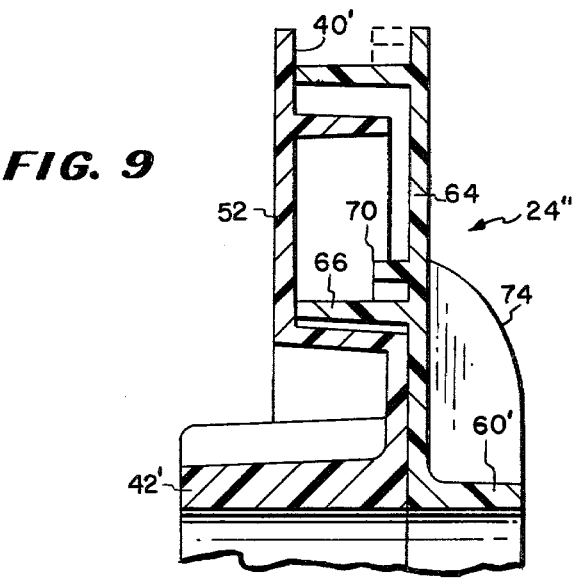
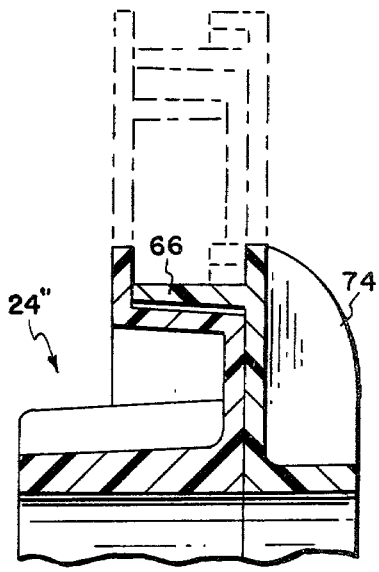

INKER RING WHEEL

BACKGROUND OF THE INVENTION

This invention relates generally to inker wheels for use with rotary type, article marking apparatus and more particularly, provides an inker wheel construction capable of being assembled into plural different size assemblies from a pair of plastic molded machinable parts, thus materially reducing the cost of manufacture of the assemblies, enabling the reduction of standing inventory, and, as well, affording a considerable reduction in weight without loss in functionality.

In U.S. Pat. No. 4,047,479 there is described an article coding device for imprinting indicia upon successive articles traveling upon a conveyor reach at an imprinting location along that reach. The article marking apparatus per se includes a train of wheels each carrying an ink absorbent ring for the transfer of ink from a source via the train of rollers ultimately to type font carried by an imprinting wheel.

In U.S. Pat. No. 4,126,090 there is described an inking ring and wheel for code daters wherein the ring is an annular band of ink adsorbent material seated permanently in an annular channeled sheel of thin ink impervious material. The ring is mountable upon the hub of a wheel for rotation therewith. The particular inking ring is of advantage in that one may grasp the same without soiling the hands because of the channled shell. It also is disposable, a factor of considerable advantage. The ring has a degree of resilience which enables it to be applied to the hub of the wheel and disassembled therefrom easily.

The inking rings of the type concerned are manufactured and employed on many different article marking machines for varying different applications. Different ring sizes both diametric and in width are required. Different wheels or mountings for these rings are necessary for use of different sized inking rings. Generally, prior inking wheels comprise hub members, often discs of wood or the like on which the ring is mounted and a pair of plates fastened on opposite sides of the hub to define a channel or like purchase for receiving the ring thereupon so that the ring rotates with the wheel. Often, the wheels comprise carefully and precisely machined stainless steel discs, the cost of which is substantial. Each different width and different diameter ring employed requires its own mounting wheel. Thus, a considerable stock of different size wheels is required to be carried as inventory. Not only does one require the manufacture of such plural wheels, but in view of the weight and necessity for fine machining, the inventory is required even for sizes which may be used only occasionally, say when a perhaps unlikely need may arise.

It would be highly desirable to eliminate the need to inventory a large number of different size mounting wheels on the chance that the use of one or the other may arise. It would be desirable to provide a wheel structure which could be formed of a so-called universal part, or a minimum number of parts, when and if their specific use is required. In such case and at such demand, the universal parts could be fabricated easily, perhaps even on the site of the article marking machine, with ordinary use of ordinary skill and simple operational step by those generally without the skill of the skilled machinist or tool maker.

It would also be advantageous to reduce the cost and weight of the wheels and enable their versatile use. If plural parts can be formed from a single master part, and if the procedure could be performed inexpensively, rapidly and results in a wheel structure equal or better functionally than the prior precisely machined wheels, considerable savings can be encountered.

One of the advantages of the said patented inking rings was that only the stock of rings are required to be carried without the need for carrying plural assembled inking wheels as often required today. However, different size inking rings still are required. Greater advantage could be taken of the benefits of using the patented disposable inking rings if one could avoid the need to carry an inventory of differently dimensioned wheels, and particularly, if the inking wheel could be selected as necessary and could be fabricated of standard parts at the site of the installation without requiring skilled expensive labor and materials, and which would permit the wheel to be formed on site when the need therefor arises and from standardized and minimum number of parts.

SUMMARY OF THE INVENTION

The invention provides an inking wheel particularly for use in an article marking apparatus and comprising a flexible inking ring including an annular band of ink absorbent material seated permanently in a channeled thin walled ink impervious liner material, a pair of dish-like disc members, each formed of a machinable plastic material, and including a central apertured hub and an outer peripheral rim, said disc members adapted to be aligned and telescopically engaged to define an outwardly opening channel for accommodating the inking ring, one of said discs having an annular flange, secondary annular flange means unitary therewith and cooperative coupling means for effecting a releasable connection between said discs, said secondary flange means capable of being removed for widening the channel defined by said rims, said secondary flange means including an annular flange concentric with said wheel and adjacent the hub, said discs capable of being reduced by machining at the hub to retain only the hub whereby to define a channel for supporting inking rings of reduced diameter on the remainent hub.

BRIEF DESCRIPTION OF THE FIGURES

FIG. 1 is a fragmentary elevational view of a code dater device having the inking wheel constructed in accordance with the invention installed as a part thereof;

FIG. 2 is an enlarged sectional view taken along lines 2—2 of FIG. 1;

FIG. 3 is an exploded perspective view of the inking wheel of the invention;

FIG. 4 illustrates there is an exploded view of the coupling means provided for securing the wheel parts together;

FIG. 4A is a sectional detail of the coupling means of FIG. 4 illustrated to show the first stage of assembly of the inking wheel;

FIG. 4B is a view similar to that of FIG. 4A but showing the locked or fully installed condition of said coupling means;

FIG. 5 is a section detail of one wheel part of FIG. 2;

FIG. 6 is a sectional detail of the wheel part illustrated in FIG. 5 but as modified in accordance with the invention to accommodate a wider inking ring.

FIG. 7 is a fragmentary sectional detail illustrating the wheel assembly carrying a wider inking ring;

FIG. 8 is an elevational view of a code dater device having an inking wheel of small diameter;

FIG. 9 is an enlarged sectional fragmentary detail of the assembled wheel of FIG. 7 but absent the inking ring;

FIG. 10 is an enlarged sectional fragmentary sectional view similar to that of FIG. 9 but illustrating the modifications thereto to define the small diameter wheel employed in the device of FIG. 8.

DESCRIPTION OF A PREFERRED EMBODIMENT

As will be described hereinafter, the inking wheel assembly provided in accordance with the invention mounts a flexible permanently lined, ink absorbing ring for employment as one or more of the members of a train of such members for carrying and transferring ink from a source ultimately to the imprinting wheel of a rotary type article marking apparatus for imprinting indicia upon articles traveling therepast.

The diameter of the wheel required may differ from use to use and, as well, different width inking rings may be employed. The inker wheel enables different wheels easily to be fabricated from a single standard or master pair of molded parts. The molded parts are formed of machinable plastics material, easily machined to fabricate both different diameter models and which include different width channels whereby to accommodate different width and/or diameter inking rings.

Referring to the drawing, in FIG. 1 there is illustrated an article imprinting apparatus 10 of the type employed in high speed code dating of bottles and described in U.S. Pat. No. 4,047,479 granted Sept. 13, 1977. Apparatus 10 includes article marking apparatus 12 mounted on plate 14 and supported pivotally for raising and lowering on an upright framework 18 via screw and wheel assembly 16 for applying imprints to the caps of bottles 20 traveling serially therepast.

The article marking apparatus 12 includes a train 22 of inker, transfer and printing wheels 24, 26 and 28 respectively, mounted for driven rotation.

The inker wheel 24 and the transfer wheel 26 of train 22 are identical. The invention herein shall be described in respect of the inker wheel 24 for convenience. An applicator 30 is rotated through an ink trough 32 which serves as a liquid ink reservoir. The ink first is applied to the inker wheel 24 which engages the transfer wheel 26 tangentially to transfer ink thereto. Transfer wheel 26 engages the type font member carried by imprinting wheel 28. The inker and transfer wheels are generally identical in construction, both including a mounting hub having a central axial passage, a channel or other means for supporting a flexible inking ring, preferably constrained against axial movement relative to the wheel on which it is mounted.

Inker wheel 24 is formed of a pair of plastic molded parts, one being driving hub 32 and the other comprising mounting hub 34. The hubs 32 and 34 are axially aligned employing fasteners 36. An inking ring 38 of the type described in U.S. Pat. No. 4,126,090 issued Nov. 21, 1978 is seated in annular channel 40.

The driving hub 32 comprises a molded body formed or rigid machineable plastic material including a central hub 42 carrying an axial passage 44, and including a concentric rim 46 joined at one end 48 of hub 42 by radial disc portion 50. An annular disc 52 extends outwardly from the free end 54 of rim 46 in a plane parallel to disc portion 50 both disc portions 50 and 52 occupying parallel planes normal to the axis of hub 42. A second annular rim 56 concentric to rim 46 is spaced inwardly of the peripheral edge 58 of disc 52.

The mounting hub 34 includes hub 60 carrying axial passage 62 and disc 64. The disc 64 is integral with hub 60 extending radially thereabout in a plane normal to the axis of passage 62. First and second concentric mounting rims 66 and 68 are formed integral with disc 64, with shallow annular concentric flanges 70 and 72 provided concentric therewith and spaced radially outward therefrom. Equispaced radial braces 74 are provided integral with the disc 64 and hub 60 to provide a purchase for grasping the wheel 24 for handling same. Flange 72 comprises the outermost portion of disc 64.

Both driving hub 32 and mounting hub 34 are of the same diametric dimension. Likewise, passageways 44 and 62 have the same inner diameter. Hub 42 is thicker than hub 60 and carries an axial ledge 76 having a threaded socket (not shown) for fastening means, such as set screw 78, for fastening the wheel 24 to a drive shaft 73 after the driving hub and mounting hub 32,34 are assembled to define wheel 24.

The wheel 24 as illustrated in FIG. 2 mounts inking ring 38 seated upon the outermost mounting rim 68. The shallow peripheral flange 72 functions to retain the flexible inking ring 38 against axial movement.

The driving hub 32 and the mounting hub 34 are assembled together coaxially aligned with disc portion 50 and disc 64 engaged. Each of driving hub 32 and mounting hub 34 carry through passageways 80 in the respective disc portion 50 and disc 64 and located symmetrically about the respective hubs thereof, the passageways being aligned when hubs 32 and 34 are assembled. The fasteners, in the form of grommets 82 are seated in the aligned passageways 80. Grommets 82 each include an expandible split end portion 84 and a reduced diameter mid-section 86 received within passageways 80.

The reduced diameter section 86 of grommet 82 has an axial bore 88 of size and configuration to enable receipt therethrough of the pin 90 of which in turn is provided with enlarged end 94. The grommets 82 are seated in bores 88 of disc 34. When the grommets 82, with disc portion 50 and disc 64 are engaged in surface contact with bores 80 aligned, the split ends 84 of grommets 82 are passed through the passageways 80. Then, the pin 90 of plunger 92 is forced further into bore 88 of each grommet 82. Since pin 90 has an enlarged free end 94, the end 84 of grommet 82 is expanded fixing the engagement of the mounting and driving hubs 32,34 to define wheel 24. The grommet-plunger arrangement selectively may be released if desired by withdrawing the head 94 from bore 88 enabling the expanded split 84 to be collapsed so that the hubs 32 and 34 may be separated, say to remove the inking ring when desired.

In the event that a wider inking ring must be employed, invention enables accommodation of such ring by simple modification of hub members 32 and 34. Referring to FIGS. 5, 6 and 7, the outermost flanges 72 is removed from member 34, as shown by the phantom representation 72' in FIG. 6. The resulting wheel 24' is illustrated in FIG. 7 carrying a wider channel 40'. Since the mounting hub 34 is formed of easily machinable plastic, little difficulty is experienced in removing flange 72.

Referring to FIG. 8, a simplified marking apparatus 10' is illustrated which is of the type employed in marking cartons traveling along the reach of a conveyor past printing wheel 26'.

The marking apparatus 10' is installed in conjunction with a conveyor table 96, the movable reach 98 of the conveyor transporting individual packages 102 in continuously moving line past the device 10' to have imprinted thereupon selected codifying indicia. The device 10' includes the printing wheel 26' rotatably mounted between support plates 100. The printing wheel 26' is rotated to apply an imprint upon engagement therewith of the package 109. The printing wheel 26' carries a plurality of printing members 104 to engage the surface of packages 102. Inker wheel 24" is spaced above the printing wheel 26' and has a small diameter as compared to the inker or transfer wheels 22,24 of apparatus 10. The outer circumferential surface of inker wheel 24' is arranged to contact the protruding members 104 to transfer ink thereto as the printing wheel 26' rotates.

The inker wheel 24" employed in device 10' includes a channel 40' to accommodate a flexible inking ring 38' here of smaller diameter than the inking and/or transfer ring 38. It should be mentioned that the diameter of rings 38 and 38' are standardized in the field.

As illustrated in FIGS. 9 and 10, the same driving and mounting hubs 32 and 34 can easily be modified to provide the wheel 24" in accordance with the invention herein.

The outer annular peripheral discs 52 and 64 of the hub members 32 and 34 including rim 56 and rim 68 along with flange 72, are removed by machining as indicated by the broken line phantom representation in FIG. 10. The braces 74 then are located flush with the remaining flange 70. Now, when the pair of remainent hub members 32 and 34 are assembled and coupled by manipulation of the grommet 82 and plunger 92, the remainent portions define channel 40' suitable for receipt of the small diameter inking ring 38' mounted on rim 66.

In FIG. 10 the innermost annular flange 70 has been removed, so that the full extent of the rim 66 is available to support the wider inking ring 38'.

Accordingly, only two elements are required yet four wheel models may be easily fabricated therefrom. The cost savings involved are substantial. The assembly is secure. The inventory requirement is reduced by 75%. One standard set such as is illustrated in FIG. 2 can be manufactured and shipped to the user, and the user easily can fabricate the other models as required by simple machining steps. Only two molds are required, resulting in material and cost savings both to the manufacturer and to the user. Machining of the plastic material is a relatively simple inexpensive task. The close tolerances, tooling and skill required in machining metal wheels as employed heretofore is not required. The securing means, i.e. grommet and plunger arrangement, are capable of manipulation for disassembly when and if desired so that the one structure can be employed in one function and easily can be modified to define a different dimensional wheel.

What is claimed is:

1. An inker wheel for transferring ink to a printing member in a rolling contact engagement and adapted to be mounted on a shaft for rotation therewith, said inker wheel comprising:

a pair of axially mateable molded disc members formed of rigid machinable plastics material and releasably coupled together axially to define a hub and a recessed peripheral mounting rim for receiving a flexible inking ring engaged therein extending partially outward thereof, means for coupling said disc members together coaxially, said disc members comprising a driving member and a mounting member, each of said members having hub defining portions including a central axial passage, means to adjust said inker wheel to accomodate said inking rings of various widths comprising at least a first pair of axially extending, unitary annular rims provided on at least one of said disc members at different distances from and concentric with the axial passage thereof, the outermost one of said rims being narrower than the innermost rim, said rims and the adjacent outer disc portion together defining the inking ring receiving recess of the peripheral mounting rim with the inner one of said rims seating the inking ring, said means to adjust enabling said inking wheel to be adjusted to receive any inking ring which is no wider than said innermost rim and at least as wide as the difference in widths of said inner and outer rims by making at least the outermost one of said first pair of rims capable of selective reduction in width to increase the usable width of said recess so as to accommodate a wider inking ring.

2. The inker ring wheel as claimed in claim 1 in which there is an additional pair of annular concentric flanges located between the hub defining portion of said first annular flange to define an inner channel, said discs capable of being reduced by machining to expose said inner channel for supporting an inking ring of reduced diameter therein.

3. The inker ring wheel as claimed in claim 2 in which the outer one of said additional pair of flanges is narrower than the other of said additional pair of flanges and is selectively capable of selective reduction in width for widening said inner channel subsequent to reduction of said discs.

4. The inker wheel as defined in claim 1 in which said coupling means comprise expandible grommet means carried by one of said disc members spaced symmetrically about the central axis thereof, alignable passage means formed in the other one of said disc members, said grommet means adapted to be introduced into said passage means and expanded to effect coupling of the discs together.

5. The inker wheel as claimed in claim 4 wherein said expandible grommet means include a hollow body having an expandible split end and pin means, including an enlarged free end portion, said pin means seated within said grommet and capable of being urged against said split end whereby to expand same for effecting said coupling.

6. The inker wheel as claimed in claim 5 wherein said pin means are retractable selectively for effecting release of said disc members.

7. The inker wheel as claimed in claim 1 and at least one concentric annular rim formed on the other of said disc members inwardly of the peripheral edge thereof in non-interferent relation with the coupling of one disc to the other.

8. An inker ring wheel capable of being rotatably mounted on a shaft for transferring ink and including a hub, a pair of side discs at opposite ends of the hub and a recessed support for an inking ring; said wheel comprising, a pair of molded disc members of rigid machinable plastic material, same including a hub defining portion having an axial passage and a peripheral edge, said disc members adapted to be coaxially coupled telescopically to define an outwardly opening channel for accommodating the inking ring therein, means to adjust said inker wheel to accommodate inking rings of various widths wherein one of said discs has a first annular axially extending concentric flange inward of the peripheral edge, a secondary annular axially extending flange disposed radially outwardly spaced from said first flange also inward of said peripheral edge and having a lesser width than said first flange to define the minimal useful width of said channel and thereby the minimum width inking ring which can be supported and a releasable connector for securing said discs together, said secondary flange defining the usable width of said channel and being selectively reducable in width to increase the maximum useful width of said channel and permit selective accommodation of a wider inking ring having a maximum width no greater than the width of said first flange.

9. An inker wheel for transferring ink to a printing member in a rolling contact engagement and adapted to be mounted on a shaft for rotation therewith, said inker wheel comprising:

a pair of axially mateable molded disc members formed of rigid machinable plastics material and releasably coupled together axially to define a hub and a recessed peripheral mounting rim for receiving a flexible inking ring engaged therein with its outer circumferential surface extending outward thereof, means for coupling said disc members together coaxially, said disc members comprising a driving member and a mounting member, at least one of said members having hub defining portions including a central axial passage, at least a pair of coaxially extending, unitary annular rims provided on one of said disc members concentric with the axial passage thereof, the outermost one of said rims being narrower than the other rim, said rims and the adjacent outer disc portions together defining the inking ring receiving recess with the inner one of said rims mounting the inking ring, at least the outermost of said rims capable of selective reduction in width for increasing the usable width of said recess and a second pair of concentric rims formed unitary with said one disc member and spaced at a predetermined radial distance from said axial passage and said first mentioned pair of rims.

10. The inker wheel as claimed in claim 9 in which said first and second pairs of rims are identical but for their diameter.

11. The inker wheel as claimed in claim 9 in which a portion of both disc members, spaced radially outward from said second pair of rims and including said first pair of rims are selectively removable to define a reduced diameter inker wheel wherein the innermost pair of rims define the recess for receiving an inking ring.

* * * * *